United States Patent [19]

Perrone

[11] 4,220,574
[45] Sep. 2, 1980

[54] POLYCHLOROPRENE PLASTICIZED WITH CORN OIL

[75] Inventor: Rosario J. Perrone, Houston, Tex.

[73] Assignee: Denka Chemical Corporation, Houston, Tex.

[21] Appl. No.: 923,017

[22] Filed: Jul. 10, 1978

[51] Int. Cl.² .................. C08J 3/18; C08K 5/01; C08K 5/11
[52] U.S. Cl. .................. 260/23.7 H; 260/23.7 M
[58] Field of Search .................. 260/23.7 H, 23.7 M

[56] References Cited

U.S. PATENT DOCUMENTS

| | | | |
|---|---|---|---|
| 3,438,971 | 4/1969 | Walker | 260/23.7 R |
| 3,668,160 | 6/1972 | Horton et al. | 260/19 R |
| 3,810,856 | 5/1974 | Dalhuisen et al. | 260/23.7 H |

FOREIGN PATENT DOCUMENTS 682877  3/1964  Canada .................. 260/23.7 H

OTHER PUBLICATIONS

Protection of Neoprene Latex Film Against Discoloration by Light, Becker et al., Rubber Chemistry and Technology, Sep. 1961, pp. 856–868.
Neoprene Latex, Carl, DuPont, Wilmington, Delaware, 1962, pp. 32–34, 56 & 129–131.
The Neoprenes, Murray et al., DuPont, Wilmington, Delaware, 1963, pp. 30, 41, 59 & 60.
Chemical Abstracts, vol. 84, No. 7, Feb. 16, 1976, p. 42128n.

*Primary Examiner*—Ronald W. Griffin
*Attorney, Agent, or Firm*—Kenneth H. Johnson

[57] ABSTRACT

Polychloroprene compounded with corn has generally similar properties to polychloroprene compounded with aromatic oils but with superior high and low temperature properties and superior ozone resistance.

3 Claims, No Drawings

POLYCHLOROPRENE PLASTICIZED WITH CORN OIL

BACKGROUND OF THE INVENTION

1. Field of the Invention

The present invention relates to improved polychloroprene which is a novel rubber composition. In particular, the invention concerns polychloroprene containing a particular vegetable oil as a plasticizer, processing aid or extender.

2. Prior Art

It is known in the art to add various oils, such as, mineral oils or vegetable oils to polychloroprene as processing aids or extenders.

Various hydrocarbons oils derived from petroleum have been used in the prior art as rubber compounding oils. Generally, oils used in relative small quantities, e.g., 2 to 20 parts of oil to 100 parts of polymer are considered as processing aids, whereby the oil actually lubricates the long chain rubber molecular, which results in more freedom of motion, less internal friction, and less heat generation during compounding. Larger quantities of oil, e.g., 25 to 40 parts or more to 100 parts of polymer, although facilitating the compounding, are added mainly to extend the polymer.

For the most part, the hydrocarbon oils, comprise either straight run lubricating oils having aromatic content (i.e., compounds containing one or more aromatic rings in the molecule). The straight run oils are relatively low in content of aromatic and naphthenic rings, whereas the extracts obtained from such oils are relatively high in the content of such rings.

In regard to polychloroprene, paraffinic oils, i.e., those having less than above 20% by weight gel aromatic content, are poor processing oils, whereas high aromatic oils are generally very good for use with neoprene (polychloroprene).

It is reported in "The Neoprenes", R. M. Murray and D. C. Thompson, a publication of the Elastomer Chemical Department, E. I. DuPont De Nemours & Co. (Inc.) Wilmington, De., 1963, that with the exception of castor oil most unsaturated vegetable oils can be used as neoprene plasticizers. Linseed oil is reported to have the best antiozonant value, rapeseed oil, the best for heat resistance and safflower oil, the best for resisting sun discoloration. Of the vegetable oil tested, Murray et al reports that all were moderately effective as low temperature plasticizers. In addition, vulcanized vegetable oil is used to extend or aid in neoprene tolerance for naphthenic petroleum oils (the naphthenic oils tend to "bloom").

The vegetable oils described in the prior art have been viewed as interesting novelties, or as specialty compounding oils. However, as petroleum prices continue to climb and the supply of petroleum in the industrial countries drops relative to demand, vegetable oils are becoming competitive in price. But, not only price is important, if the vegetable oil supplants or supplements conventional oils. Those vegetable oils previously investigated and reported in the art, i.e., castor oil, linseed oil rapeseed oil and safflower oil, for use with polychloroprene would not appear to have had properties which resulted in their commercial use.

SUMMARY OF THE INVENTION

In has been found that polychloroprene containing a compounding amount of corn oil has excellent properties. Corn oil is a superior compounding oil because of its high softening efficiency, high loading compatibility, excellent processing characteristics, excellent low temperature properties, and effectiveness as an ozone and heat stabilizer.

In addition, corn oil exhibits comparable compression set at elevated temperature to the petroleum oils and moderately good oil resistance.

The excellent brittleness temperature properties exhibited by polychloroprene compounded with corn oil would indicate that it can replace costly organic esters employed currently for this purpose.

Thus, among the principal advantages of the present invention are polychloroprene compositions having improved resistance to ozone and heat and improved low temperature properties.

It would appear that corn oil possesses all of the benefits of those vegetable oils reported in the prior art and the additional attributes of low temperature plasticizing at low cost.

The corn oil employed may be processed or unprocessed, although the unprocessed corn oil is preferred, first because of cost and secondly, because it would appear to contain components, such as natural vegetable waxes, that may be beneficial in the present compositions and which are substantially removed during processing. Corn oil is composed principally of triglycerides, which are polyunsaturates, monounsaturates and saturates. The polyunsaturates comprise over 50 weight percent of the triglycerides.

A "compounding amount" of oil as that term is used here generally connotes from about 2 to 80 parts by weight of corn oil per 100 parts of polychloroprene polymer, although lesser or greater amounts may be employed within the contemplated scope of the present invention.

The compositions according to the present invention may contain petroleum compounding oils in amounts such that the petroleum oil is the major (over 50% by weight) compounding oil with the corn oil supplementing the petroleum oil and providing those benefits and advantages noted above.

The polychloroprene compositions of the present invention include copolymers in which chloroprene is the major or predominant monomer, i.e., 50% mol % or more. Comonomers which may be employed are such as 2,3-dichloro-1,3-butadiene, acrylonitrite, methyl methacrylate and sulfur. The polymers may be produced with chain transfer agents such as the mercaptans or the xanthogens or as in the case of the sulfur copolymers, may be peptized after polymerization.

The corn oil may be employed in any polychloroprene rubber where petroleum oils or other compounding oils have been used heretofore. Generally, from 2 to 80 parts of corn oil per 100 parts of polychloroprene will be used, as described above for plasticizing, processing or extending the rubber.

DETAILED DESCRIPTION OF THE INVENTION AND SPECIFIC EMBODIMENTS

For the purpose of demonstrating this invention crude, unrefined corn oil was employed. The properties of the corn oil were:

| | |
|---|---|
| density$_{25}^{25}$ | 0.916–0.921 |
| flash point | 321° C. |

-continued

| | |
|---|---|
| $\eta_D^{25}$ | 1.470–1.474 | son in accordance with recipe in TABLE I. The compounding was carried out in a Banbury mixer at 77 rpm and 22 psi.

TABLE I

| Example | 1 | 2 | 3 | 4 | 5 | 6 | 7 | 8 |
|---|---|---|---|---|---|---|---|---|
| Neoprene M2.4 | 100.0 | 100.0 | 100.0 | 100.0 | 100.0 | 100.0 | 100.0 | 100.0 |
| Reaction product of diphenylamine and diisobutylene (Octamine) | 1.0 | 1.0 | 1.0 | 1.0 | 1.0 | 1.0 | 1.0 | 1.0 |
| MgO (Maglite D bar) | 4.0 | 4.0 | 4.0 | 4.0 | 4.0 | 4.0 | 4.0 | 4.0 |
| Stearic Acid | 0.5 | 0.5 | 0.5 | 0.5 | 0.5 | 0.5 | 0.5 | 0.5 |
| N 762 (SRF carbon black) | 58.0 | 116.0 | 174.0 | 232.0 | 58.0 | 116.0 | 174.0 | 232.0 |
| Aromatic Processing oil (Flexon 340) | 15.0 | 30.0 | 50.0 | 80.0 | — | — | — | — |
| Raw Corn Oil | — | — | — | — | 15.0 | 30.0 | 50.0 | 80.0 |
| Zinc Oxide | 5.0 | 5.0 | 5.0 | 5.0 | 5.0 | 5.0 | 5.0 | 5.0 |
| Mixture of thiocarbomates (Vanex NP) | .5 | .5 | .5 | .5 | .5 | .5 | .5 | .5 |
| Zinc dibutyl thiocarbamate (Butyl Zimate) | .5 | .5 | .5 | .5 | .5 | .5 | .5 | .5 |
| Tert-methyl thiuram disulfide (Methyl Tuads) | .5 | .5 | .5 | .5 | .5 | .5 | .5 | .5 |
| Sulfur | .3 | .3 | .3 | .3 | .3 | .3 | .3 | .3 |
| Zinc diethyl dithiocarbamate and zinc 2-benzo thiozole (Vancide 51) | — | — | — | — | .25 | .25 | .25 | .25 |

A commercial grade of polychloroprene (Denka Chemical Corporation Neoprene M2.4) was employed. This is of the same type as the DuPont W Types and is polymerized with an alkyl mercaptan chain transfer agent. The M2.4 has the following properties:

Mooney viscosity, ML1+2 1/2/4@212° F.: 65±5
form: off white clips

This base stock was compounded using raw corn oil and a commercial aromatic processing oil for compari- Uncured samples of each compound example were evaluated and the results reported in TABLE II.

TABLE II

| Example | 1 | 2 | 3 | 4 | 5 | 6 | 7 | 8 |
|---|---|---|---|---|---|---|---|---|
| Mooney Plasiticity, 212° F., 100° C. | | | | | | | | |
| ML 1 + 4, minimum | 58.0 | 64.0 | 83.5 | 78.0 | 48.5 | 55.8 | 66.5 | 57.0 |
| Mooney Scorch, MS at 250° F., 121° C. | | | | | | | | |
| Minutes to 5 point rise | 36.0 | 30.6 | 30.6 | 37.9 | 26.5 | 26.3 | 28.1 | 38.7 |
| Minutes to 10 point rise | 39.2 | 34.0 | 34.8 | 44.2 | 29.5 | 30.1 | 31.6 | 44.3 |
| Monsanto Rheometer | | | | | | | | |
| 1° ARC, Temp 350° F., 177° C. | | | | | | | | |
| Min. Torque, in-lb. | 5.9 | 8.0 | 9.1 | 9.0 | 5.2 | 5.5 | 6.8 | 6.1 |
| Max. Torque, in-lb. | 34.0 | 40.1 | 40.0 | 34.5 | 28.3 | 22.8 | 22.4 | 20.0 |
| Scorch, time to 2 in lb rise, minute | 1.75 | 1.45 | 1.50 | 1.60 | 1.70 | 1.55 | 1.35 | 1.50 |
| 80% Cure rate, minutes | 3.35 | 3.10 | 5.45 | 7.10 | 3.15 | 4.50 | 5.20 | 6.00 |

Portions of the unaged rubber compounds of TABLE I were cured under three sets of conditions which are shown in TABLE III with the physical test results.

TABLE III

| Example | 1 | 2 | 3 | 4 | 5 | 6 | 7 | 8 |
|---|---|---|---|---|---|---|---|---|
| Original Physical Properties | | | | | | | | |
| Press Cure: 7.5 minutes at 307° F., 153° C. | | | | | | | | |
| 200% Modulus, psi | 700 | 1200 | 1120 | 785 | 650 | 1100 | 1080 | — |
| Tensile Strength, psi | 2380 | 1900 | 1180 | 785 | 2380 | 1650 | 1100 | 650 |
| Elongation at break, % | 540 | 310 | 215 | 200 | 535 | 300 | 200 | 150 |
| Hardness, Shore A | 53.0 | 69.0 | 79.0 | 83.0 | 33.0 | 70.0 | 79.0 | 80.0 |
| Die "C" Tear, pi | 285 | 215 | 165 | 130 | 260 | 190 | 140 | 95 |
| Press Cure: 15 minutes at 307° F., 153° C. | | | | | | | | |
| 200% Modulus, psi | 900 | 1750 | — | — | 820 | 1360 | — | — |
| Tensile Strength, psi | 2770 | 2225 | 1480 | 1080 | 2680 | 1950 | 1250 | 825 |
| Elongation at break, % | 460 | 260 | 120 | 190 | 460 | 225 | 185 | 170 |
| Hardness, Shore A | 56.5 | 72.5 | 81.0 | 82.5 | 54.0 | 57.0 | 78.0 | 79.0 |
| Die "C" Tear, pi | 275 | 230 | 165 | 125 | 255 | 165 | 135 | 100 |
| Press Cure: 30 minutes at 307° F., 153° C. | | | | | | | | |
| 200% Modulus, psi | 1150 | 2075 | — | — | 900 | 1750 | — | — |
| Tensile Strength, psi. | 2700 | 2225 | 1690 | 1175 | 2700 | 2075 | 1350 | 950 |
| Elongation at break, % | 375 | 210 | 155 | 150 | 440 | 235 | 165 | 165 |
| Hardness, Shore A | 59.5 | 74.5 | 84.5 | 85.0 | 55.0 | 70.5 | 80.5 | 81.0 |
| Die "C" Tear, pi | 270 | 190 | 145 | 130 | 265 | 170 | 145 | 105 |

Next portions of the rubber compounds of TABLE I were aged for 7 days at 100° C. and tested. The cure conditions and results are set out IN TABLE IV.

TABLE IV

Aged Physical Properties
Oven Aged 7 days at 212° F., 100° C.
Cured 7.5 minutes at 307° F., 153° C.

| Example | 1 | 2 | 3 | 4 | 5 | 6 | 7 | 8 |
|---|---|---|---|---|---|---|---|---|
| Tensile Strength, psi | 2500 | 1920 | 1450 | 1125 | 2360 | 1900 | 1240 | 675 |
| Tensile Retained, % | 105.0 | 101.0 | 122.9 | 143.3 | 99.2 | 115.2 | 112.3 | 103.9 |
| Elongation at break, % | 260 | 50 | 0 | 10 | 335 | 185 | 135 | 125 |
| Elongation Retained, % | 48.2 | 16.1 | 0 | 0.5 | 62.6 | 61.7 | 67.5 | 83.3 |
| Hardness Shore A | 79.0 | 93.0 | 94.0 | 96.5 | 67.5 | 80.0 | 85.5 | 87.0 |
| Hardness Change | +26.0 | +24.0 | +15.0 | +7.5 | +14.5 | +10.0 | +6.5 | +7.0 |
| Press Cure: 15 minutes at 307° F., 153° C. | | | | | | | | |
| Tensile Strength, psi | 2530 | 1930 | 1400 | 1215 | 2400 | 1950 | 1320 | 690 |
| Tensile Retained, % | 91.3 | 86.7 | 94.6 | 112.5 | 89.6 | 100.0 | 105.6 | 83.0 |
| Elongation at break, % | 240 | 60 | 7.5 | 18 | 325 | 175 | 145 | 120 |
| Elongation Retained, % | 52.2 | 23.1 | 6.3 | 9.5 | 70.7 | 77.8 | 78.4 | 70.6 |
| Hardness, Shore A | 78.0 | 93.5 | 93.5 | 96.5 | 65.0 | 79.0 | 86.0 | 85.0 |
| Hardness, Change | +21.5 | +21.0 | +22.5 | +24.0 | +11.0 | +22.0 | +8.0 | +14.0 |
| Press Cure: 30 minutes at 307° F., 153° C. | | | | | | | | |
| Tensile Strength, psi | 2525 | 2025 | 1525 | 1150 | 2400 | 1900 | 1275 | 740 |
| Tensile Retained, % | 91.2 | 91.0 | 103.0 | 106.5 | 89.6 | 97.4 | 102.0 | 89.7 |
| Elongation at break, % | 240 | 70 | 5 | 20 | 330 | 185 | 135 | 130 |
| Elongation Retained, % | 52.2 | 26.9 | .42 | 1.05 | 71.7 | 82.2 | 73.0 | 76.5 |
| Hardness, Shore A | 78.5 | 94.5 | 96.0 | 97.0 | 63.5 | 78.0 | 84.0 | 87.0 |
| Hardness Change | +19.0 | +20.0 | +11.5 | +12.0 | +7.5 | +7.5 | +3.5 | +6.0 |

Oil resistance was tested on samples immersed in oil at 100° C. for 70 hours. The results are reported in TABLE V.

In a final set of tests, high temperature and low temperature properties, extruder characteristics and ozone resistance were evaluated. The conditions and results are shown in TABLE VI.

TABLE V

Oil Immersion, ASTM #3 Oil
70 hrs at 212° F.

| Example | 1 | 2 | 3 | 4 | 5 | 6 | 7 | 8 |
|---|---|---|---|---|---|---|---|---|
| Press Cure: 7.5 minutes at 307° F., 153° C. | | | | | | | | |
| Tensile Strength, psi | 1360 | 1400 | 1225 | 710 | 1010 | 965 | 750 | 365 |
| Tensile Retained, % | 59.1 | 73.7 | 103.8 | 90.5 | 42.4 | 58.5 | 68.2 | 56.2 |
| Elongation at break, % | 340 | 285 | 200 | 190 | 320 | 305 | 235 | 185 |
| Elongation Retained, % | 63.0 | 91.9 | 93.0 | 95.0 | 59.8 | 101.7 | 117.5 | 123.3 |
| Hardness, Shore A | 23.0 | 33.0 | 49.0 | 55.0 | 18.0 | 28.0 | 41.0 | 44.0 |
| Hardness Change | −30.0 | −36.0 | −30.0 | −28.0 | −35.0 | −42.0 | −38.0 | −36.0 |
| Press Cure: 15 minutes at 307° F., 153° C. | | | | | | | | |
| Tensile Strength, psi | 1340 | 2185 | 1140 | 660 | 1150 | 1060 | 990 | 510 |
| Tensile Retained, % | 48.4 | 95.5 | 77.0 | 61.1 | 42.9 | 55.8 | 79.2 | 61.8 |
| Elongation at break, % | 280 | 180 | 175 | 150 | 290 | 240 | 200 | 175 |
| Elongation Retained, % | 60.9 | 69.2 | 145.8 | 79.0 | 63.0 | 106.7 | 133.3 | 102.9 |
| Hardness, Shore A | 31.0 | 75.0 | 53.0 | 58.0 | 24.0 | 36.0 | 47.0 | 52.0 |
| Hardness Change | −25.5 | +2.5 | −19.5 | −24.5 | −30 | −21.0 | −31.0 | −27.0 |
| Press Cure: 30 minutes at 307° F., 153° C. | | | | | | | | |
| Tensile Strength, psi | 1600 | 1750 | 1600 | 1070 | 1310 | 1425 | 1225 | 740 |
| Tensile Retained, % | 59.3 | 78.7 | 94.7 | 91.1 | 48.5 | 68.7 | 90.7 | 77.9 |
| Elongation at break, % | 285 | 200 | 150 | 145 | 285 | 210 | 190 | 165 |
| Elongation Retained, % | 76.0 | 95.2 | 96.8 | 96.7 | 64.8 | 89.4 | 115.2 | 100.0 |
| Hardness, Shore A | 36.0 | 52.0 | 64.5 | 70.5 | 30.5 | 46.0 | 49.0 | 59.0 |
| Hardness Change | −23.5 | −22.5 | −20.0 | −14.5 | −24.5 | −24.5 | −31.5 | −32.0 |

TABLE VI

| Example | 1 | 2 | 3 | 4 | 5 | 6 | 7 | 8 |
|---|---|---|---|---|---|---|---|---|
| Compression Set Method "B" 25% DEF (ASTM) | | | | | | | | |
| Buttons 25 min. cured at 307° F. 153° C. | | | | | | | | |
| 22 hrs at 158° F., 70° C., % set | 7.6 | 8.2 | 13.4 | 24.9 | 9.6 | 13.2 | 17.6 | 26.4 |
| 70 hrs at 212° F., 100° C., % set | 42.6 | 42.3 | 57.2 | 73.3 | 45.6 | 48.2 | 56.1 | 69.9 |
| Scott Brittleness | | | | | | | | |
| Brittle Point | | | | | | | | |
| Brittle Point, °C. | −40 | −36 | −34 | −36 | −45 | −47 | −50 | −47 |
| Brittle Point, °F. | −40 | −32.8 | −29.2 | −32.8 | −49 | −52.6 | −58 | −52.6 |
| Brabender Extruder, ⅛ DIE | | | | | | | | |
| Barrel 60° C. Head 70° C., Temp. | | | | | | | | |
| Out put, in/min. | 57.6 | 52.5 | 39.3 | 26.3 | 58.5 | 64.5 | 33.8 | 25.3 |
| Rate, gms/min. | 133.15 | 153.66 | 127.01 | 90.98 | 127.24 | 195.35 | 113.39 | 88.66 |
| Die Swell, % | 58.16 | 21.19 | 8.68 | 2.09 | 68.09 | 17.11 | 4.70 | 0.78 |
| Mast Ozone Chamber | | | | | | | | |
| 100 pphm, 100° F., 20% Stress | | | | | | | | |

TABLE VI-continued

| Example | 1 | 2 | 3 | 4 | 5 | 6 | 7 | 8 |
|---|---|---|---|---|---|---|---|---|
| Time to cracking, hrs | <24 | <24 | <24 | <24 | ≧48+ | ≧48+ | ≧48+ | ≧48+ |

Overall the corn oil compounded polychloroprene is generally comparable with aromatic oil, particularly over the range of 15 to 50 parts of oil per 100 parts of rubber. However, high and low temperature properties and ozone resistance of the present compositions are superior to those of the aromatic oil at all levels. In addition, corn oil does not readily bloom as do the naphthlenic petroleum oils.

A fungicide (Vancide 51) was incorporated in the corn oil blends however, the necessity of this material has not been established and its use is precautionary.

The invention claimed is:

1. A polychloroprene rubber composition having excellent resistance to heat and ozone and excellent low temperature properties comprising polychloroprene as the sole polymer and from 15 to 50 parts by weight of corn oil per 100 parts of polychloroprene.

2. The composition according to claim 1 wherein said corn oil is unprocessed corn oil.

3. The composition according to claim 1 additionally containing aromatic petroleum oil.

* * * * *

UNITED STATES PATENT AND TRADEMARK OFFICE
CERTIFICATE OF CORRECTION

PATENT NO. : 4,220,574
DATED : September 2, 1980
INVENTOR(S) : Rosario J. Perrone It is certified that error appears in the above—identified patent and that said Letters Patent is hereby corrected as shown below:

ABSTRACT, line 1 reads "with corn has" but should read -- with corn oil has --

Column 2, line 47 reads "lonitrite" but should read -- lonitrile --

TABLE I, opposite "Example", over first column, no number but should read -- 1 --

Signed and Sealed this

Fourth Day of August 1981

[SEAL]

Attest:

Attesting Officer

GERALD J. MOSSINGHOFF

Commissioner of Patents and Trademarks